Figure 1:
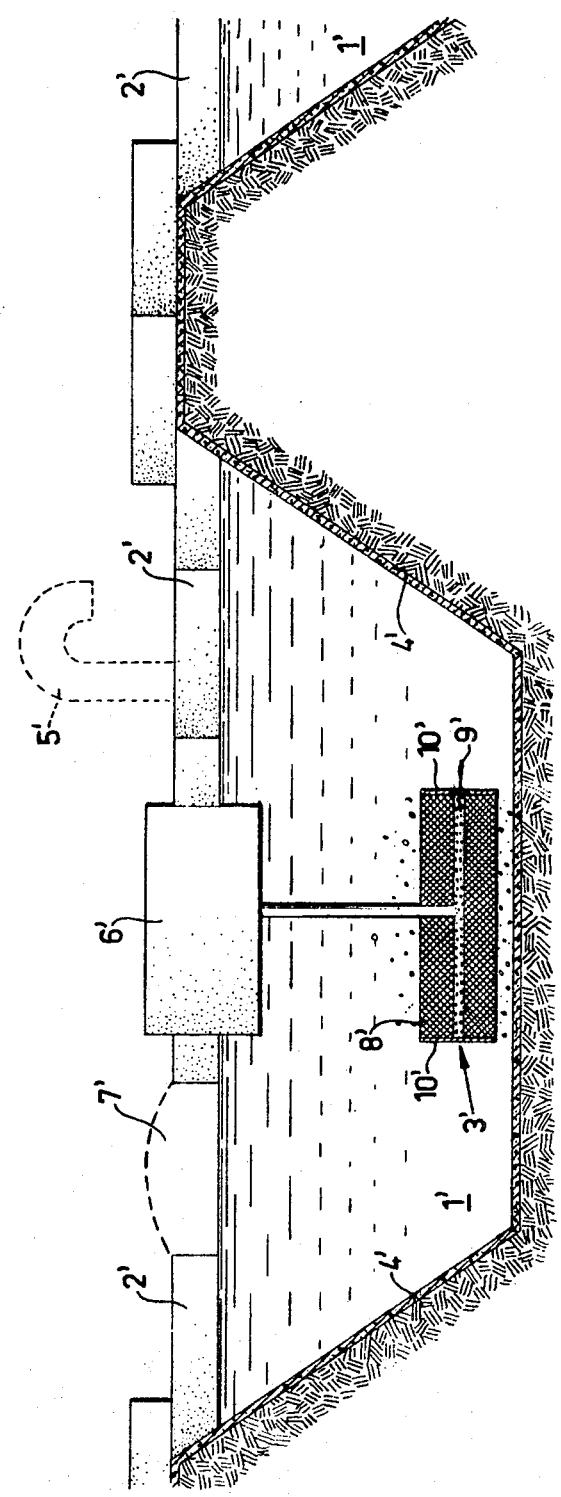

United States Patent

[11] 3,626,901

| [72] | Inventor | Sixten Englesson<br>Djursholm, Sweden |
|---|---|---|
| [21] | Appl. No. | 824,120 |
| [22] | Filed | May 13, 1969 |
| [45] | Patented | Dec. 14, 1971 |
| [73] | Assignee | Stenberg-Flygt AB<br>Solna, Sweden |
| [32] | Priorities | Jan. 23, 1969 |
| [33] | | Sweden |
| [31] | | 924/69;<br>July 1, 1968, Sweden, No. 9040/68 |

[54] PROCEDURE AND ARRANGEMENT FOR BREEDING OF FISH
9 Claims, 6 Drawing Figs.

| [52] | U.S. Cl. | 119/3 |
| [51] | Int. Cl. | A01k 63/00 |
| [50] | Field of Search | 119/3, 5 |

[56] References Cited
UNITED STATES PATENTS

| 2,676,921 | 4/1954 | Vansteenkiste | 119/5 X |
| 3,166,043 | 1/1965 | Castillo | 119/3 |
| 3,179,084 | 4/1965 | Norris et al. | 119/5 |
| 3,234,123 | 2/1966 | Hinde | 119/3 X |
| 3,320,928 | 5/1967 | Smith | 119/3 |

Primary Examiner—Hugh R. Chamblee
Attorney—Sughrue, Rothwell, Mion, Zinn & Macpeak ABSTRACT: A fish-breeding pond is covered with a highly insulating floating layer so as to effectively diminish the losses of heat to the atmosphere and thus with the aid of the heat of the soil to maintain the temperature of the water rather above 5° C., at the same time achieving an effective supply of oxygen through aeration of the water.

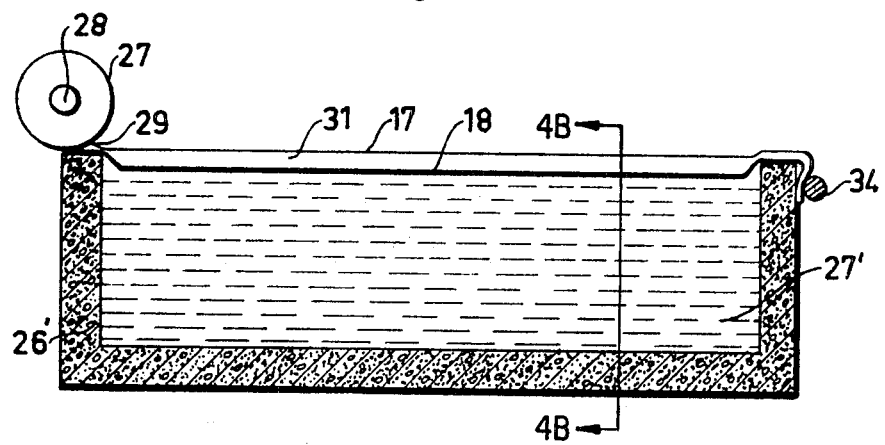
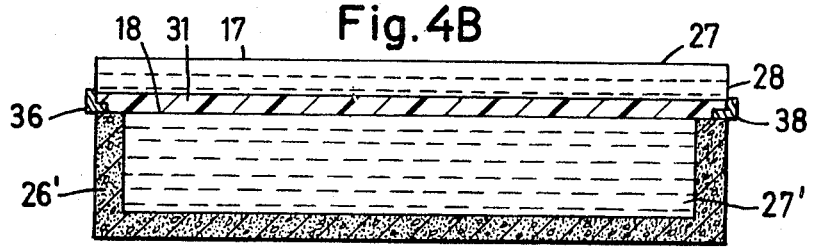
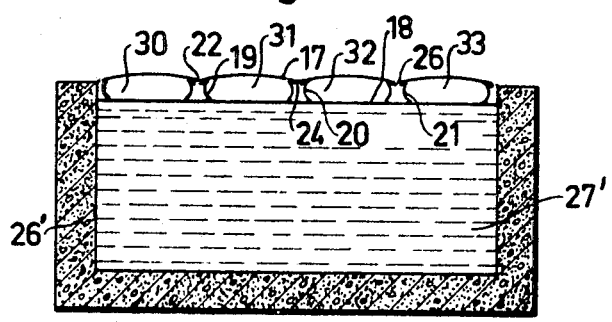

PROCEDURE AND ARRANGEMENT FOR BREEDING OF FISH

The invention relates to a method for improving the productivity in fish-breeding ponds.

A disadvantage of earlier known fish-breeding procedure is that the temperature in the ponds during the cold season of the year falls in cold climates to below about 5° C., as a result of which the bacterial flora in the intestinal canal of the fish becomes inactive and the fish therefore cease to eat. Naturally the growth of the fish ceases during the corresponding period. The function of the plant is confined during that period to maintain the fish alive until the next warm period.

A further disadvantage of earlier fish-breeding procedures is that the quantity of oxygen dissolved in the comparatively small volume of water in the pond diminishes when the water surface becomes covered with ice unless there is a satisfactory supply of oxygenated water. This is a problem, since an adequate oxygen content in the water is a vital condition for the life of the fish.

The object of the present invention is to eliminate said disadvantages and thereby to raise the productivity of fish-breeding through a combination of measures which extend the period of growth of fish bred in the ponds of fish-breeding institutions to comprise the cold season of the year as well.

It is known that, by covering the surface of the ground with a layer of insulating material, one can maintain a soil temperature above 0° C. even at very low atmospheric temperature. The soil temperature in deep underground chambers remains around 8° C. and falls during the cold season of the year the closer one comes to the ground surface.

The present invention consists essentially of covering the surface of the ponds and possibly a part of the edges, and the ground surface surrounding the pond, with a highly insulating, floating layer of, for example, cellular plastic, and so effectively diminishing the losses of heat to the atmosphere, so that, with the aid of the heat of the soil, one can wholly or partially maintain the temperature of the water rather above 5° C., at the same time achieving an effective supply of oxygen through aeration of the water in the ponds with a blower and/or aeration device, for example of the type described in U.S. Pat. No. 3,416,776, issued Dec. 17, 1968.

The invention also relates to a device for implementation of this procedure, characterized essentially in the fact that the insulation of the water surface consists of a plastic covering preferably floating on the water surface and composed of at least two, preferably transparent, plastic foils or plastic fabrics of, for example, polyethylene held together by means of seams or fastening devices, e.g. tubular spacers, arranged at a given distance from one another. The plastic cover may be composed of at least three foils or fabrics held together by welded seams, the seams of two of the foils or fabrics being displaced in relation to one another by half a seam-spacing.

According to one embodiment of the invention channels running through the plastic cover are arranged for aeration of the water, the channels preferably passing through the fastening devices or being arranged in connection with the welded seams of the plastic cover.

To readily allow uncovering and covering of the water surface, the plastic cover, according to a further development of the invention, is arranged to be rolled up on a hollow cylinder at one side, preferably one short side of a fish-pond. The cylinder can be provided with inlets for air for inflation of the cover and with holes or slots along the joint between the cover and the cylindrical surface so that air can be supplied to cavities in the plastic cover. AT the side of the pond opposite to the cylinder for rolling up the plastic cover, a hollow boom may also be arranged, through which air can be released from the cover when it is rolled up.

Figure 2:
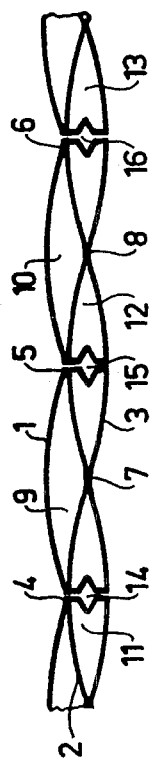
Figure 3:
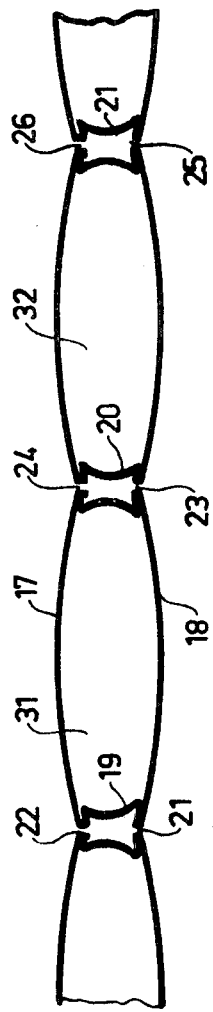

The invention will now be described in relation to some embodiments as appears from the attached drawings, on which FIG. 1 shows a cross section of an embodiment of the invention in which the surface of the fish-pond is insulated from the ambient atmosphere, FIG. 2 shows a plastic cover composed of three foils or fabrics, FIG. 3 shows one of two plastic fabrics held together by tubular spacers, FIG. 4A shows a fish-pond according to the invention view in cross section from the side, FIG. 4B shows a cross-sectional view of the pond in FIG. 4A along the line 4B–4B, showing the guide rails for guiding the plastic foils or fabrics 17 and 18, and FIG. 5 shows a cross section of the pond in FIG. 3 along a plane perpendicular to the cross section plane in FIG. 3.

In FIG. 1, 2' denotes a highly insulating, floating layer of, for example, cellular plastic, the object of which is effectively to prevent loss of heat from the surface of the fish-pond 1' to the air above the highly insulating layer 2'. The layer 2', if required, can be extended over the ground surface around the edges of the fish-pond, since insulation with highly insulating material, such as cellular plastic, has proved to maintain the temperature of the ground covered by said material above 0° C. even when the atmospheric temperature is very low. How far to the sides the insulating layers should extend will, of course, depend on actors such as the local temperature, the thermal conductivity of the materials of which the sides 4' of the pond are constructed, the local temperature gradient of the soil etc.

The aerating device 3', preferably of the type described in the aforesaid patent, has the object of ensuring an oxygen content in the water adequate for the fish. The aerating device 3' consists essentially of blocks 8' of soft or semisaft cellular plastic with open cells immersed in the water, having at least one, preferably cylindrical, channel 9' connected to a source of compressed air so that air is pressed out through the cells and broken down into a very large number of extremely small air bubbles. The block 8' is spanned between end plates 10' which are so heavy that they prevent the air-filled block from floating up, even without anchorage of the block on the bottom of the pond.

Preferentially a ventilating shaft 5' and feeding shaft 6' can be arranged in conjunction with the aerating device 3', and possibly also one or more light cupolas 7'.

By using the form of oxygen supply described above the lowering of temperature usually caused by flowing water, for example, is avoided.

According to the embodiment in FIG. 1, at least the surface of the pond is insulated from the outer air by means of insulating material. Through the embodiment shown in FIGS. 2–5 the application and removal of the insulating material is simplified, at the same time as an insulating layer which is very light in elation to its weight is obtained.

As appears from FIG. 2, the said insulating layer may consist, for example, of a plastic cover composed of two or more plastic foils or fabrics arranged at a certain distance from one another and held together by seams of fastening devices. In FIG. 2 the plastic fabrics 1, 2 and 3 are held together in the manner that seams 4, 5 and 6, e.g. welded seams, hold together the plastic foils or fabrics 1 and 2, while seams 7 and 8 hold together plastic foils 2 and 3, seams 7 and 8 being displaced laterally in relation to seams 4 and 5. In this way a cover is obtained which is composed of sector-shaped air cavities 9, 10, 11, 12 and 13. At a certain distance from one another in the longitudinal direction of the seams ventilating channels 14, 15, 16 can be arranged in the seams for aeration of the water. In the middle of these channels a bellows-shaped section may be arranged for following the movement of the cover during inflation with air and release of air.

FIG. 3 shows another embodiment of the invention in which there are two plastic foils or fabrics 17 and 18, held together by tubular spacers 19, 20 and 21. The tubular spacers are preferably of rectangular secton and may be furnished with openings at their upper and lower ends in connection with plastic foils 17 and 18, respectively, and with ventilating holes 21, 22, 23, 24, 25, 26. The two plastic foils may be held together by welded seams which run along the upper and lower surfaces of the tubular spacers; if necessary there may be two welded seams at the top and two at the bottom.

The resulting cover is inflated and should preferably float on the water surface, which it protects from cold, direct and snow.

FIGS. 4A, 4B and 5 show how a cover of the type shown in FIG. 3 can be applied to the water surface of a pond and removed from it. In FIGS. 4A, 4B and 5 the walls and bottom of the pond are denoted 26', the water in the pond 27', the upper and lower plastic foils of the cover 17 and 18, and the ventilating holes 22, 24 and 26.

As appears from FIG. 4A, on the left-hand short side of the basin there is a hollow cylinder 27, which is thought to be carried in fork-shaped bearings so that it can easily be lifted away during the warm season of the year. The cylinder is envisaged to have an inlet for air 28 and holes or slots 29 through which the air from the cylinder 27 penetrates out into the cavities 30, 31, 32 and 33 of the cover. As appears from FIGS. 4 and 5, the spacers 19, 20 and 21 are oriented perpendicular to rolling-up direction. On the side of the plastic cover opposite to the cylinder there is a hollow boom 34 for, among other purposes, release of the air from the cover when it is rolled up. Rolling up of the cover is done by wrapping it on cylinder 27 at the same time as one or more valves are opened on boom 34. The boom is envisaged it have slots at the junction between the boom and cover, so that air from cavities 30, 31, 32 and 33 can be pressed out from the cover to the hollow boom and through the latter into the atmosphere.

When the cover is to be placed on he water surface, a pull is exercised on the boom 34 at the same time as air is pressed into the cover.

Guides 36 and 38 for the side edges of the cover may, if necessary, be arranged on two sides (long sides) on the pond, as shown in FIG. 4B.

Although the invention has been described in relation to some of its embodiments, it can be varied as desired with the scope of the following claims.

What I claim is:

1. A device for raising the productivity in fish breeding ponds comprising, a thermal insulating means covering the entire water surface of said pond, said insulating means being floatingly supported on the water surface, said thermal insulating means comprising at least two plastic fabric sheets positioned adjacent each other, said plastic fabric sheets having a plurality of fastening means therebetween for joining said two sheets together, said fastening means being positioned at a predetermined distance from each other, a thermal insulating lining positioned at the sides and bottom of the pond between the ground and the water contained thereby to form the pond, a means for aerating the water in the pond, said aerating means including a plurality of porous blocks submerged below the water surface and being connected with an air supply source, whereby said thermal insulating means prevents a decrease in the water temperature of the pond and the water is supplied with additional oxygen from said air supply source and said porous block enables the air to be better absorbed in the water.

2. A device for raising productivity in fish breeding ponds as claimed in claim 1, wherein aid sheet fastening means comprises tubular spacers positioned parallel to each other between said two sheets, said sheets being secured to said tubular spacers, said tubular spacers having ventilating channels therethrough communicating the water surface with the ambient atmosphere for assisting in the aeration of the water.

3. A device for raising the productivity in fish breeding ponds as claimed in claim 1, further comprising a third plastic sheet positioned adjacent to and connected with said two plastic sheets, said three plastic sheets being joined together alternately at said sheet fastening means and directly with each other to form seams, the seams for said sheets being displaced by one-half a seam spacing relative to one another.

4. A device for raising the productivity in fish breeding ponds as claimed in claim 1, wherein aid thermal insulating means includes a plurality of air tight channels passing therethrough, said channels being arranged in conjunction with aid joining means, whereby said channels furnish additional support to said thermal insulating means upon inflation thereof.

5. A device for raising the productivity in fish breeding ponds as claimed in claim 4, further comprising, a hollow cylinder positioned on one side of said pond, said hollow cylinder being attached to one edge of said thermal insulating means, whereby said thermal insulating means may be rolled onto said hollow cylinder for storage purposes.

6. A device for raising the productivity in fish breeding ponds as claimed in claim 5 wherein said hollow cylinder further comprises an air inlet connected o an air supply source and a plurality of air outlets communicating with said channels in aid thermal insulating means for inflation of said channels therein.

7. A device for raising the productivity of fish breeding ponds as claimed in claim 6, further comprising a rigid hollow boom attached to the side of said plastic sheets opposite said cylinder, whereby said boom causes the air to be forced out of the cavities in said plastic sheets when said insulating means is rolled onto said hollow cylinder.

8. A device for raising the productivity in fish breeding ponds as claimed in claim 7, further comprising two guides, each of said guides positioned along the sides of the pond which are perpendicular to the hollow roller for providing guide means for the edges of the thermal insulating means.

9. A device for raising the productivity in fish breeding ponds as claimed in claim 1, wherein aid thermal insulating lining positioned at the sides and bottom of the pond is comprised of porous concrete.

* * * * *